United States Patent [19]
Melchior

[11] 3,849,988
[45] Nov. 26, 1974

[54] COMBUSTION CHAMBERS FOR INTERNAL COMBUSTION ENGINES EQUIPPED WITH A TURBO-COMPRESSOR UNIT WITH REHEATING UPSTREAM OF THE TURBINE

[75] Inventor: Jean Melchior, Paris, France
[73] Assignee: Etat Francais, Paris, France
[22] Filed: Mar. 29, 1973
[21] Appl. No.: 345,966

[30] Foreign Application Priority Data
Apr. 6, 1972  France .............................. 72.12112

[52] U.S. Cl. .................................. 60/606, 60/39.65
[51] Int. Cl. ............................................ F02b 37/04
[58] Field of Search ............................. 60/13, 39.65

[56] References Cited
UNITED STATES PATENTS

| | | | |
|---|---|---|---|
| 2,633,698 | 4/1953 | Nettel .................. | 60/13 N |
| 2,669,090 | 2/1954 | Jackson ............... | 60/13 N |
| 2,775,238 | 12/1956 | Clark et al. ......... | 60/39.65 |
| 3,736,752 | 6/1973 | Mechior................ | 60/13 |

FOREIGN PATENTS OR APPLICATIONS

| | | | |
|---|---|---|---|
| 321,933 | 11/1929 | Great Britain ......... | 60/13 |
| 699,854 | 11/1953 | Great Britain ......... | 60/13 |

*Primary Examiner*—William L. Freeh
*Assistant Examiner*—Warren Olsen
*Attorney, Agent, or Firm*—Barnes, Kisselle, Raisch & Choate

[57] ABSTRACT

A Diesel engine equipped with such a combustion chamber is supplied, on one head with fuel, and on the other hand at the same time by exhaust gases emerging from the engine and by fresh air taken through a by-pass pipe at the outlet from the compressor of the turbo-compressor unit. The combustion chamber has a tubular element with a closed end and an open end, at least one fuel injector located towards the closed end, and a primary air intake for leading fresh air into the tubular element at a combustion zone near its closed end. The combustion chamber has also an exhaust gas intake to introduce the exhaust gases into the tubular element at a mixing zone near its open end, this being done with minimum load loss and along an orientation slightly inclined with respect to the axis of the tubular element towards its open end and a secondary air intake for leading fresh air into the tubular element at the mixing zone, this being done perpendicularly to the flow of the introduced exhaust gases, and so that the flow of secondary air is opposed by the flow of the exhaust gases, by interaction of the jets.

21 Claims, 1 Drawing Figure

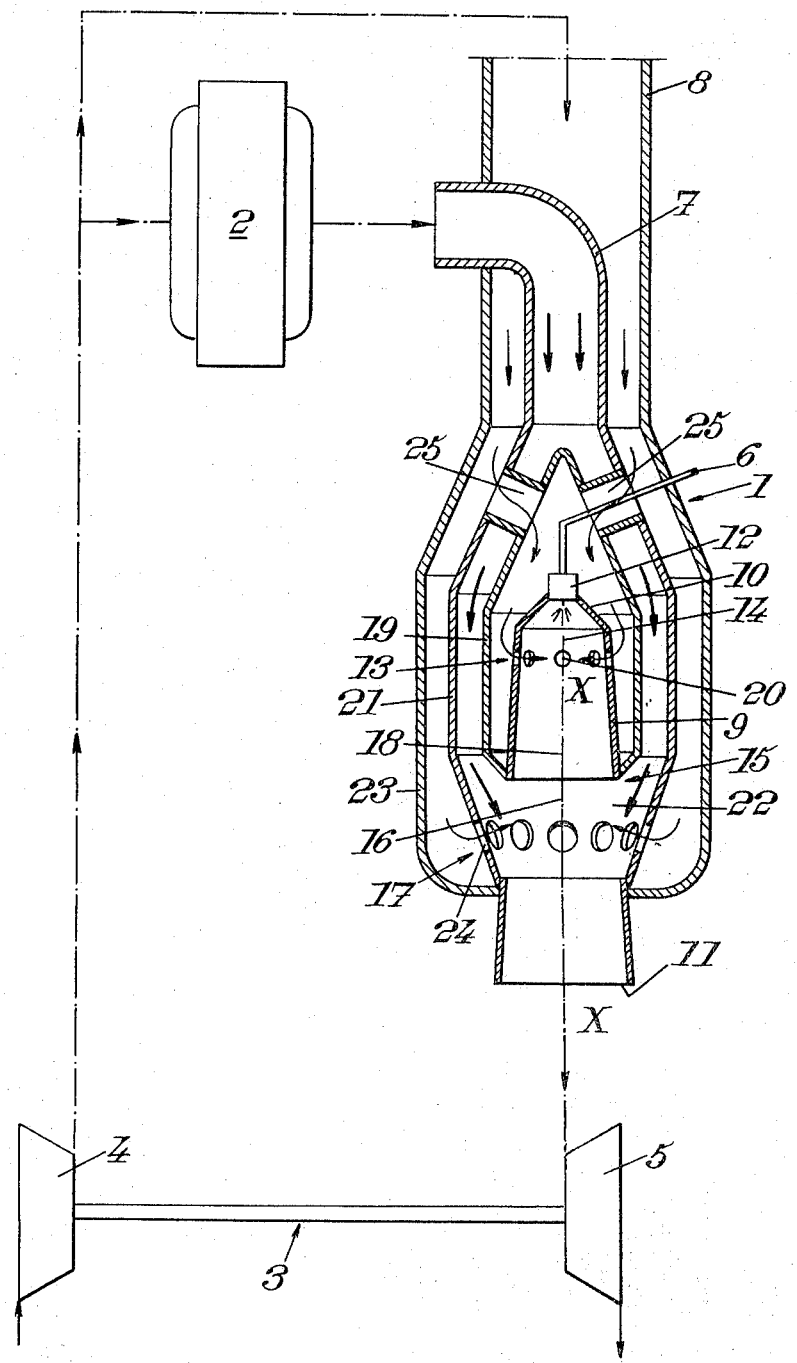

COMBUSTION CHAMBERS FOR INTERNAL COMBUSTION ENGINES EQUIPPED WITH A TURBO-COMPRESSOR UNIT WITH REHEATING UPSTREAM OF THE TURBINE

The invention relates to combustion chambers for internal combustion engines, especially for Diesel engines equipped with a turbo-compressor unit with reheating upstream of the turbine of said turbo-compressor unit.

An engine of this type is therefore supercharged by a turbo-compressor unit comprising at least one compressor delivering fresh air to the engine and at least one turbine, driving said compressor, and actuated by the exhaust gases.

Upstream of this turbine is a combustion chamber supplied, on one hand with fuel, and on the other hand with at the same time exhaust gases coming from the engine and fresh air taken through a bypass pipe at the outlet from the compressor.

The combustion chamber receives therefore oxygen-poor gas (exhaust gas from the engine) and oxygen-rich gas (fresh air delivered by the compressor), the relative flow-rates of these two gases being variable as a function of the rotary speed of the engine, that is to say its rate; in fact, at a high rate the engine absorbs much fresh air and rejects much exhaust gas (the combustion chamber is then supplied by a considerable flow-rate of exhaust gas and by a low flow-rate of fresh air), whilst at reduced rate, or even on idling, the engine absorbs little fresh air and rejects little exhaust gas (the combustion chamber is supplied by a low flow-rate of exhaust gas and by a considerable flow-rate of fresh air).

This relative variation can reach proportions of 1 to 10 between operation of the engine at full speed and operation of the engine at idling speed.

It will hence be understood that this relative variation of the flow-rates of the exhaust gas and of fresh air poses problems of combustion stability, especially on acceleration and deceleration of the rotary speed of the engine.

In fact, in these two cases the exhaust gases can contain fuel which has not been burnt in the engine and the carburetted mixture thus constituted risks being exploded on its passage into the combustion chamber, this explosion risking the blowingout of the flame and causing extinction of the chamber.

It is a principal object of the invention to avoid such occurrences taking place.

Furthermore, the combustion chamber constitutes an obstacle to the passage of the exhaust gases towards the turbine and it is therefore advantageous to arrange it so that it causes the least load loss possible, that is to say, so that it causes the least obstruction to the flow of exhaust gases and therefore produces as small a pressure drop as possible in the flow path of exhaust gases. Thus, the term "load loss" as used herein is used in this sense, or, viewed another way, in the sense of the back pressure loading produced by the combustion chamber on the engine exhaust system.

The invention has therefore a second object of avoiding causing the exhaust gases to pass through orifices of the flame tube of the combustion chamber and of using directly the kinetic energy of these exhaust gases to ensure dilution in the combustion chamber.

The combustion chamber according to the invention comprises a tubular element having one end closed and one end open, at least one fuel injector situated towards the closed end of the tubular element, and a primary air intake arranged to introduce fresh air into the tubular element at the level of a combustion zone in the neighbourhood of its closed end, and it is characterised by the fact that it comprises also, an exhaust gas inlet arranged to introduce the exhaust gases into the tubular element at the level of a mixing zone in the neighbourhood of its open end, this introduction being effected with a minimum load loss and along an orientation slightly inclined with respect to the axis of the tubular element and in the direction of its open end, and a secondary air intake arranged to introduce fresh air into the tubular element at the level of the abovesaid mixing zone, this introduction being effected in an orientation perpendicular (approximately at least) to the flow of exhaust gases thus introduced and so that the flow of secondary air is counteracted by the flow of exhaust gases, by the interaction of the jets.

It will then be appreciated, due to this feature, that there is obtained a dilution effect due to the exhaust gases and to the fresh air introduced into the mixing zone, the combination of the two flows thus introduced into the abovesaid mixing zone obtaining an entraining effect which generates a suction zone between the mixing zone and the combustion zone.

This suction zone causes permanent aspiration of fresh air around the combustion zone, which stabilises combustion and avoids blowing out the flame even when explosions are produced due to the presence of unburnt materials in the exhaust gases.

In order to construct a combustion chamber according to this feature, recourse is advantageously had to the following embodiment according to which, the primary air intake is constituted by a primary space surrounding the closed end of the tubular element which is then provided with orifices, the exhaust gas intake is constituted by an annular intermediate space of which the downstream portion is connected to the tubular element downstream of the primary space, and the secondary air intake is constituted by a secondary space surrounding the intermediate space and opening through orifices formed in the downstream portion of the intermediate space and arranged so that the exhaust gases are opposed to the radial introduction of secondary fresh air by a phenomenon of interaction of the jets.

The invention consists, apart from the features which have just been considered above, of certain other features which are preferably used at the same time and which will be more explicitly considered below.

The invention will in any case be well understood by means of the complement of description which follows as well as the accompanying drawing, which complement and drawing relate to a preferred embodiment of the invention and do not of course comprise any limiting character.

The single FIGURE of this drawing, is a diagrammatic view in section illustrating a combustion chamber according to the invention.

This combustion chamber 1 is intended to form part of an installation comprising an internal combustion engine 2 (such as for example a Diesel engine) supercharged by turbo-compressor unit 3 and provided with reheating upstream of the turbine; the turbo-compressor unit 3 comprises at least one compressor 4 delivering compressed air to the engine 2, and at least one turbine 5, driving said compressor 4, and actuated by the exhaust gases from the engine 2.

The combustion chamber 1, ensuring the reheating, is arranged upstream of the turbine 5 and this combustion chamber 1 is supplied, on one hand, with fuel through a passage 6, and on the other hand at the same time by the exhaust gases coming from the engine 2 and by means of an exhaust pipe 7 and by fresh air taken at the outlet from the compressor 4 by means of a bypass pipe 8.

This combustion chamber 1 comprises, a tubular element 9 having a closed end 10 and an open end 11, at least one fuel injector 12 situated towards the closed end 10 of the tubular element 9 and receiving fuel, which has to ensure the reheating, through the passage 6, and a primary air intake 13 arranged for introducing fresh air into the tubular element 9 at the level of a combustion zone 14 in the neighbourhood of its closed end 10.

According to the invention there is then provided,

An exhaust gas intake 15 arranged to introduce these exhaust gases into the tubular element 9 at the level of a mixing zone 16 in the neighbourhood of its open end 11, this introduction being effected with a minimum of load loss and along an orientation slightly inclined with respect to the axis XX of the tubular element 9 and in the direction of its open end 11, and a secondary air intake 17 arranged to introduce fresh air into the tubular element 9 at the level of the abovesaid mixing zone 16, this introduction being effected along an orientation perpendicular (approximately at least) to the flow of exhaust gases thus introduced and so that the flow of secondary air is opposed by the flow of the exhaust gases, by the interaction of the jets.

The uniting of the two flows thus introduced into the mixing zone 16 procures a horn effect which generates a suction zone 18 between the mixing zone 16 and the combustion zone 14.

The primary air intake 13 can advantageously be constituted by a primary space 19 surrounding the closed end 10 of the tubular element 9 which is then provided with a plurality of orifices 20, distributed regularly over its circumference, if necessary along several series staggered axially.

As for the exhaust gas intake 15, it can advantageously be constituted by an intermediate space 21 of annular shape, and of which the downstream portion is connected to the tubular element 9 downstream of the primary space 13, this connection being effected by an annular orifice 22.

As for the secondary air intake 17, it can advantageously be constituted by a secondary space 23 surrounding the intermediate space 21 and opening through orifices 24 arranged in the downstream portion of the intermediate space 21 and arranged so that the exhaust gases are opposed to the radial introduction of fresh secondary air by a phenomenon of interaction of the jets.

The intermediate space 21 is connected directly to the exhaust pipe 7, and the secondary space 23 is connected directly to the bypass pipe 8.

To enable the supply of fresh air from the primary space 19, there are provided passages 25 traversing the intermediate space 21 and connecting the secondary space 23 to the primary space 19.

In the FIGURE there is shown by arrows in heavy line the circulation of the exhaust gases, and by arrows in a thin line the circulation of fresh air.

Preferably, the primary space 19 has a streamlined shape around which are arranged the upstream portion of the intermediate space 21 and the upstream portion of the secondary space 23, these upstream portions hence having a continuous shape ensuring their connection respectively to the exhaust pipe 7 and to the bypass pipe 8.

The downstream portion of the intermediate space 21 is connected to the tubular element 9 so as to facilitate the introduction of exhaust gases in the direction of the open end 11 of the tubular element 9; this downstream portion hence having a convergent frustroconic shape towards the abovesaid open end 11.

The downstream portion of the secondary space 23 is connected to the tubular element 9 so as to facilitate the radial introduction of fresh air perpendicularly to the axis XX of the tubular element 9; this downstream portion hence having a deflecting shape in the direction of the axis XX.

Finally and whatever the embodiment adopted, the combustion chamber according to the invention has a certain number of advantages among which may be mentioned those summarized by the following points:

the risk of blowing out of the flame is practically eliminated due to permanent aspiration of fresh air around the combustion zone;

the kinetic energy of the exhaust gases ensures the dilution and cooling of the hot gases resulting from combustion;

the exhaust gases undergo a minimal load loss;

the structure of the combustion chamber is simple and enables easy and inexpensive construction.

As is self-evident, and as emerges already from the foregoing, the invention is in no way limited to its types of application and embodiments which have been more especially envisaged; it encompasses, on the contrary all modification.

I claim:

1. Combustion chamber for a turbo-compressor unit associated with an internal combustion engine operable for reheating gases upstream of the turbine of said turbo-compressor unit, said combustion chamber being adapted to be supplied with fuel and at the same time by exhaust gases emerging from the engine and by fresh air taken through a bypass pipe connected between the outlet of the compressor and the inlet of said turbine of said turbo-compressor unit in bypass relation to the engine, said combustion chamber comprising a tubular element having a closed end and an open end, at least one fuel injector located toward the closed end of the tubular element, a primary air intake conduit adapted to communicate with said bypass pipe and having an outlet arranged to introduce fresh air into the tubular element in a combustion zone in the vicinity of its closed end, an exhaust gas intake conduit adapted to communicate with the exhaust outlet of the engine and having an oulet arranged to introduce the exhaust gases into the tubular element in the neighborhood of its open end at a mixing zone located downstream of said combustion zone and wherein the primary air or the products of combustion thereof with the fuel first meet the exhaust gases, said exhaust gas conduit outlet being oriented to effect said introduction with minimum load loss and in the direction of the open end of said tubular element, and a secondary air intake conduit adapted to communicate with said bypass pipe and having an outlet arranged to introduce fresh air into the tubular element downstream of the upstream end of said mixing zone, said secondary air conduit outlet being arranged to introduce fresh air in the form of a jet stream oriented in a direction transverse to the flow of the exhaust gases in said mixing zone such that the flow of secondary air into said mixing zone is opposed by the flow of the exhaust gases in said mixing zone whereby the interaction of the secondary air jet stream with the exhaust gas stream varies the ratio of primary air to secondary air entering said tubular element in accordance with the flow of exhaust gases into said mixing zone.

2. The combustion chamber set forth in claim 1 wherein said primary air intake conduit defines a primary space surrounding the closed end of the tubular element, said tubular element having a plurality of orifices distributed regularly over its circumference for admitting primary air from said primary space into said combustion zone.

3. The combustion chamber set forth in claim 2 wherein said exhaust gas intake conduit defines a space of annular shape intermediate said primary space and said secondary air conduit and wherein said exhaust conduit outlet is connected to the tubular element downstream of the primary space.

4. The combustion chamber set forth in claim 3 wherein said exhaust conduit outlet comprises an annular orifice.

5. The combustion chamber set forth in claim 1 wherein the secondary air intake conduit defines a secondary space surrounding at least a portion of said exhaust conduit, and said secondary air conduit outlet comprises a plurality of orifices arranged in the downstream portion of said exhaust conduit and oriented such that the secondary air is introduced into said mixing zone in the form of a circumferentially distributed array of jets directed into the flow of exhaust gases in said mixing zone in a direction generally radially of the axis of said tubular element, said exhaust gases flowing generally axially of said tubular element in said mixing zone.

6. The combustion chamber set forth in claim 5 wherein said exhaust gas intake conduit defines a space of annular shape intermediate said primary conduit and said secondary air conduit and wherein said exhaust conduit outlet is connected to the tubular element downstream of the primary conduit.

7. The combination set forth in claim 6 wherein said secondary conduit is connected to said primary conduit by passages traversing said intermediate space of said exhaust conduit.

8. The combustion chamber set forth in claim 6 wherein said primary air conduit has a streamlined shape around which are arranged an upstream portion of said exhaust conduit and an upstream portion of said secondary air conduit, these upstream conduit portions having a continuous shape leading to their connections respectively to the exhaust pipe and to the bypass pipe.

9. The combustion chamber set forth in claim 8 wherein the downstream portion of said exhaust conduit is connected to the tubular element by a conduit of frustoconic shape convergent towards the open end of the tubular element and encircling the outlet of said combustion zone.

10. The combustion chamber set forth in claim 9 wherein the downstream portion of said secondary air conduit is connected to the tubular element by having an air deflecting shape for deflecting secondary air into said secondary conduit outlet orifices in the direction of the axis of the tubular element.

11. In combination, an internal combustion engine and a combustion chamber as defined in claim 1.

12. In combination, a diesel engine and a combustion chamber as defined in claim 1.

13. In combination, a supercharged internal combustion engine of the expansible chamber type comprising a turbo-compressor with at least one compressor and at least one turbine for driving said compressor, a bypass pipe communicating with the outlet of said compressor and with the turbine inlet, said engine having a combustion chamber system connected between said compressor and said turbine such that said engine combustion chamber system is in parallel air flow relation with said bypass pipe, an auxiliary combustion chamber operable for reheating gases upstream of said turbine, said auxiliary combustion chamber being supplied with fuel and at the same time by exhaust gases emerging from said engine combustion chamber system and by fresh air taken through said bypass pipe, said auxiliary combustion chamber comprising a tubular element having a closed end and an open end, at least one fuel injector located toward the closed end of the tubular element, a primary air intake conduit communicating with said bypass pipe and having an outlet arranged to introduce fresh air into the tubular element in a combustion zone in the vicinity of its closed end, an exhaust gas intake conduit communicating with the exhaust outlet of said engine combustion chamber system and having an outlet arranged to introduce the exhaust gases into the tubular element in the neighborhood of its open end at a mixing zone located downstream of said combustion zone and wherein the primary air or the products of combustion thereof with the fuel first meet the exhaust gases, said exhaust gas conduit outlet being oriented to effect said introduction with minimum load loss and in the direction of the open end of said tubular element, and a secondary air intake conduit communicating with said bypass pipe and having an outlet arranged to introduce fresh air into the tubular element downstream of the upstream end of said mixing zone, said secondary air conduit outlet being arranged to introduce fresh air in the form of a jet stream oriented in a direction transverse to the flow of the exhaust gases in said mixing zone such that the flow of secondary air into said mixing zone is opposed by the flow of the exhaust gases in said mixing zone whereby the interaction of the secondary air jet stream with the exhaust gas stream varies the ratio of primary air to secondary air entering said tubular element in accordance with the flow of exhaust gases into said mixing zone.

14. The combination set forth in claim 13 wherein said primary air intake conduit defines a primary space surrounding the closed end of the tubular element, said tubular element having orifice means for admitting primary air from said primary space into said combustion zone.

15. The combination set forth in claim 14 wherein said exhaust gas intake conduit defines a space of annular shape intermediate said primary space and said secondary air conduit and wherein said exhaust conduit outlet is connected to the tubular element downstream of the primary space.

16. The combination set forth in claim 15 wherein said exhaust conduit outlet comprises an annular orifice.

17. The combination set forth in claim 16 wherein the secondary air intake conduit defines aecondary space surrounding at least a portion of said exhaust conduit, and said secondary air conduit outlet comprises a plurality of orifices arranged in the downstream portion of said exhaust conduit and oriented such that the secondary air is introduced into said mixing zone in the form of a circumferentially distributed array of jets directed into the flow of exhaust gases in said mixing zone in a direction generally radially of the axis of said tubular element, said exhaust gases flowing generally axially of said tubular element in said mixing zone.

18. The combination set forth in claim 17 wherein said secondary conduit is connected to said primary conduit by passages traversing said intermediate space of said exhaust conduit.

19. The combination set forth in claim 18 wherein said primary air conduit has a streamlined shape around which are arranged an upstream portion of said exhaust conduit and an upstream portion of said secondary air conduit.

20. The combination set forth in claim 19 wherein the downstream portion of said exhaust conduit is connected to the tubular element by a conduit of frustoconic shape convergent towards the open end of the tubular element and encircling the outlet of said combustion zone.

21. The combination set forth in claim 20 wherein the downstream portion of said secondary air conduit is connected to the tubular element by having an air deflecting shape for deflecting secondary air into said secondary conduit outlet orifices in the direction of the axis of the tubular element.

* * * * *